United States Patent [19]

Bond et al.

[11] 4,334,277

[45] Jun. 8, 1982

[54] HIGH-ACCURACY MULTIPLIERS USING ANALOG AND DIGITAL COMPONENTS

[75] Inventors: James W. Bond; Harper J. Whitehouse, both of San Diego, Calif.

[73] Assignee: The United States of America as represented by the Secretary of the Navy, Washington, D.C.

[21] Appl. No.: 968,603

[22] Filed: Dec. 11, 1978

Related U.S. Application Data

[63] Continuation-in-part of Ser. No. 837,342, Sep. 28, 1977, abandoned.

[51] Int. Cl.[3] .......................... G06F 7/72; G06F 7/52; G06J 1/00

[52] U.S. Cl. .................................... 364/703; 364/606; 364/746; 364/758

[58] Field of Search ................................ 364/600-606, 364/703, 739, 746, 758, 844

[56] References Cited

U.S. PATENT DOCUMENTS

| | | | |
|---|---|---|---|
| 3,146,343 | 8/1964 | Young | 364/600 |
| 3,167,645 | 1/1965 | Hoffmann et al. | 364/746 |
| 3,183,342 | 5/1965 | Wortzman | 364/606 |
| 3,573,448 | 4/1971 | Valentine | 364/606 |
| 3,576,432 | 4/1971 | Braaten | 364/701 |
| 3,586,838 | 6/1971 | Henderson | 364/844 |
| 3,609,328 | 9/1971 | Kieburtz | 364/746 |
| 3,673,392 | 6/1972 | Holm | 364/606 |
| 3,739,159 | 6/1973 | Nalley | 364/602 |
| 3,900,719 | 8/1975 | Yamauchi | 364/606 |
| 4,064,400 | 12/1977 | Akushsky et al. | 364/746 |
| 4,107,783 | 8/1978 | Huang | 364/746 |

*Primary Examiner*—Felix D. Gruber
*Attorney, Agent, or Firm*—Robert F. Beers; Ervin F. Johnston; John Stan

[57] ABSTRACT

An apparatus multiplies two sequences of digital numbers $a_i$ and $b_i$, which may represent signal pulses of various amplitudes. A first plurality of t read-only memories (ROMs), have a common input adapted to receive the sequence of numbers $a_i$, each ROM coding the numbers $a_i$ into $a_{j,i}=a_j$ modulo $m_i$, $0 \leqq a_{j,i} \leqq m_i-1$. A first plurality of t means, extend the digital signal with zero values, the number of zeroes being determined by the length N of the sequences being convolved. A first plurality of t D/A converters, convert the digital quantity received from the extender into its corresponding analog value.

Similar ROMs, extending means, and D/A converters process the sequence numbers $b_i$.

A plurality of t means convolve two input analog signals, one from each of the first and second D/A converters, the output of each convolving means being an analog signal, approximately equal to the convolution $(a_{j,i}) * (b_{j,i})$ modulo $m_i$. A plurality of t A/D converters, convert the analog signal back to digital form. A plurality of t means multiply by an integer $u_i$. The integer $u_i$ is defined by the relationship $u_i=1$ mod m; for j=i and $u_j=0$ and $m_j$ for $j \neq i$, where the $m_i$ represent integers and the $u_i$ represent integers pairwise relatively prime. Means are provided for summing the outputs of the multiplying means. Further means reduce the output of the summing means to a value between $0 \leqq m(=m_i, m_2, \ldots, m_t)-1$ congruent to the output of the summing means modulo.

9 Claims, 2 Drawing Figures

BASIC HIGH ACCURACY ANALOG MULTIPLIER.

FIG. 1. BASIC HIGH ACCURACY ANALOG MULTIPLIER.

GENERAL HIGH ACCURACY ANALOG MULTIPLIER.

HIGH-ACCURACY MULTIPLIERS USING ANALOG AND DIGITAL COMPONENTS

CROSS-REFERENCE TO RELATED APPLICATION

This application is a continuation-in-part of the application having the Ser. No. 837,342, dated Sept. 28, 1977 and now abandoned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to apparatus able to perform high accuracy calculations using low accuracy analog multipliers.

The prior art wholly digital approach requires devices of high complexity, hence high cost. The apparatus of this invention utilizes low-complexity digital devices, digital-to-analog and analog-to-digital converters and low-cost analog devices to perform multiplication. The apparatus utilizes digital circuits to do residue class arithmetic. A novel feature of the device described here is that it combines analog devices with the digital circuits via digital-to-analog and analog-to-digital converters.

SUMMARY OF THE INVENTION

An apparatus multiplies two sequences each of N numbers $a_i$ and $b_i$, which may represent signal pulses of various amplitudes. It comprises a first plurality of t read-only memories (ROMs), having a common input adapted to receive the sequence of N numbers $a_i$, each ROM coding the numbers $a_i$ into $a_{j,i}=a_i$ modulo $m_i$, $O\leqq a_{j,i}\leqq m_i-1$.

A first plurality of t means, an input of each connected to an output of a read-only memory, extend the digital signal with N-1 zero values. A first plurality of t digital-to-analog (D/A) converters, an input of each being connected to an output of a zero extender, convert the digital quantity received from the extender into its corresponding analog value.

A second plurality of t read-only memories (ROMs), have a common input adapted to receive the sequence of numbers $b_i$, each ROM coding the N numbers $b_i$ $b_{j,i}=b_j$ modulo $m_i$,$O\leqq b_{j,i}\leqq m_i-1$. A second plurality of t digital-to-analog (D/A) converters, an input of each being connected to an output of a zero extender, convert the digital quantity received from the extender into its corresponding analog value.

A second plurality of t digital-to-analog (D/A) converters, an input of each being connected to an output of a zero extender of the second plurality, convert the digital quantity received from the extender into its corresponding analog value..

A plurality of t means convolve the two input analog signals, one from each of the first and second D/A converters. The output of each convolving means is an analog convolved signal, approximately equal to the convolution $(a_{j,i})$ * $(b_{j,i})$ modulo $m_i$. It is "approximately equal" because a digital-to-analog conversion (or A/D) is seldom exact.

A plurality of t analog-to-digital (A/D) converters, each having its input connected to the output of one of the convolvers, convert the analog signal back to digital form.

A plurality of t means multiply each of their input signals by an integer $u_i$, each means having an input connected to an output of an A/D converter, the integer $u_i$ being defined by the relationship $u_i=1 \bmod m_i$ and $u_j=0 \bmod m_j$ for $j\neq i$. The $m_i$ represent integers and the $u_i$ represent integers pairwise relatively prime. Means are provided for summing, whose inputs comprise the t multiplying means.

Means, whose input is connected to the output of the summing means, reduce the output of the summing means to a value between $0\leqq m(=m_1, m_2, \ldots, m_t)-1$ congruent to the output modulo m.

OBJECTS OF THE INVENTION

An object of the invention is to provide multipliers which are more accurate than similar prior art devices.

Another object of the invention is to provide high-accuracy multipliers which use relatively low-accuracy analog multipliers.

These and other objects of the invention will become more readily apparent from the ensuing specification when taken together with the drawings.

DESCRIPTION OF THE PREFERRED EMBODIMENTS

Figure 1:
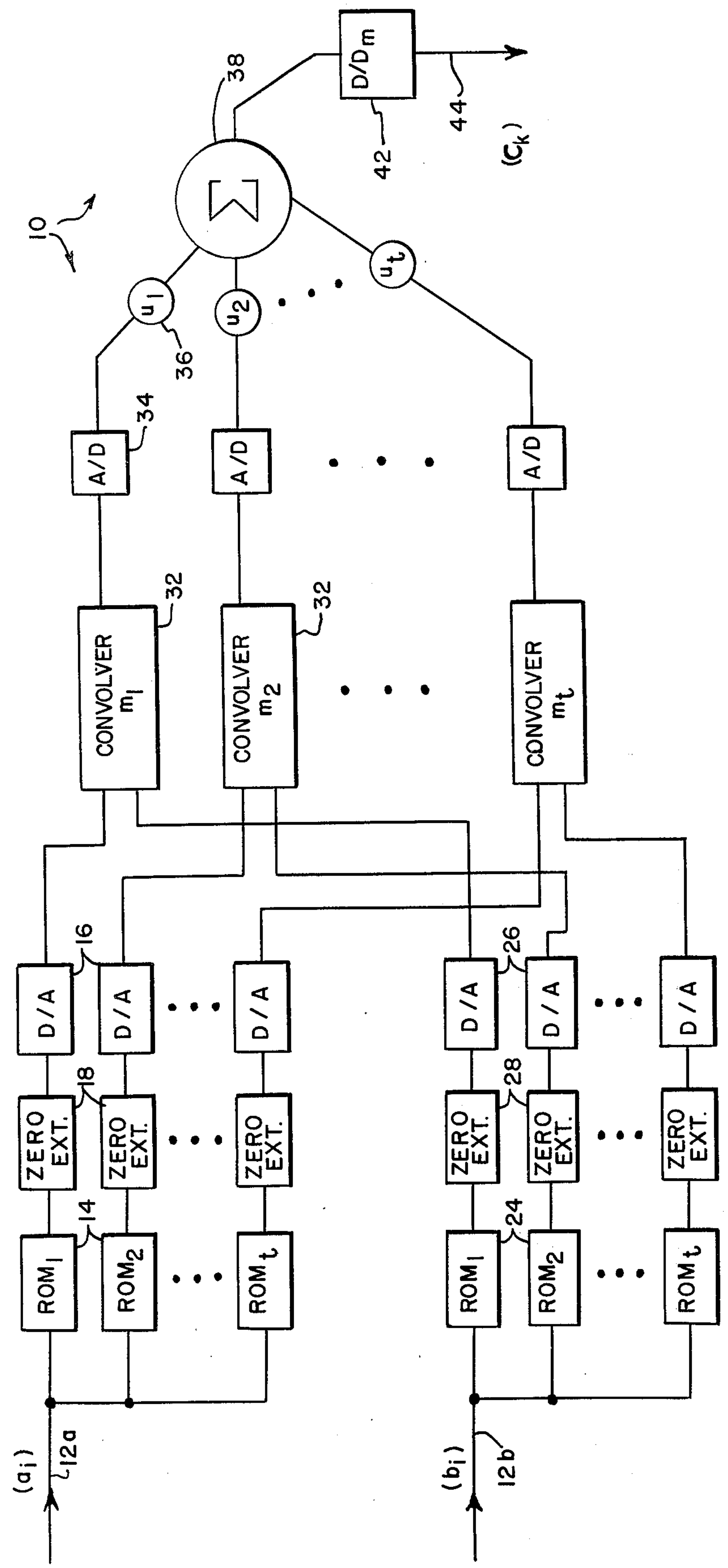
FIG. 1 is a block diagram of the basic high-accuracy analog multiplier.

Referring now to FIG. 1, therein is shown an apparatus 10 for multiplying two sequences of binary numbers $a_i$ and $b_i$, which may represent signal pulses of various amplitudes. The apparatus 10 comprises a first plurality of t read-only memories (ROMs) 14, having a common input 12*a*, which are adapted to receive the sequence of numbers $a_i$, each ROM coding the binary numbers $a_i$ into $a_{j,i}=a_j$ modulo $m_i$, $0\leqq a_{j,i}\leqq m_i-1$.

A first plurality of t means 18, an input of each connected to an output of a read-only memory 14, extends the read-only memory 14 digital signal with the required number of zero values.

The zero extenders 18 consist of a buffer between the read-only memories 14 and the D/A converters 16, and allow a synchronization of the inputs to the D/A's with a timed reset circuit to assure that the input sequences are extended by the required number of zeroes for the convolvers 32 to calculate the desired convolution outputs.

A first plurality of t digital-to-analog (D/A) converters 16, an input of each being connected to an output of a zero extender 18, convert the digital quantity received from the extender into its corresponding analog value.

A second plurality of t read-only memories (ROMs) 24 have a common input 12*b*, adapted to receive the sequence of binary numbers $b_i$, each ROM coding the numbers $b_i$ into $b_{j,i}=b_j$ modulo $m_i$, $0\leqq b_{j,i}\leqq m_i-1$. A second plurality of t means 28, an output of each connected to an output of a read-only memory 24, extend the digital signal with zero values, when required.

A second plurality of t digital-to-analog (D/A) converters 26, an input of each being connected to an output of a zero extender 28 of the second plurality, convert the digital quantity received from the extender into its corresponding analog value.

A plurality of t means for convolving 32 convolve the two input analog signals, one from each of the first and second D/A converters, 16 and 26, the output of each convolving means being an analog convolved signal, approximately equal to the convolution $(a_{j,i}) * (b_{j,i})$ modulo $m_1$. The means for convolving may comprise charge-coupled devices.

A plurality of t analog-to-digital (A/D) converters 34, each having its input connected to the output of one of the convolvers 32, convert the analog signal back to digital form.

A plurality of t means 36 are provided for multiplying the outputs of the A/D converters 34 by an integer $u_i$. Each means 36 has an input connected to an output of an A/D converter 34. The integer $u_i$ is defined by the relationship $u_i = i \bmod m_i$ for $j=1$ and $u_j = 0 \bmod m_j$ for $j \neq i$, where the $m_i$ represent relatively prime. The means for multiplying may comprise charge-coupled devices or analog tapped delay lines.

The means for summing 38 sum the outputs of the t multiplying means 36.

Means 42, whose input is connected to the output of the summing means 38, reduce the output of the summing means to a value between 0 and $(m-1)$, that is, between $0 \leqq m(=m_i m_2 \ldots m_t) - 1$ congruent to it (the output) modulo m.

Figure 2:
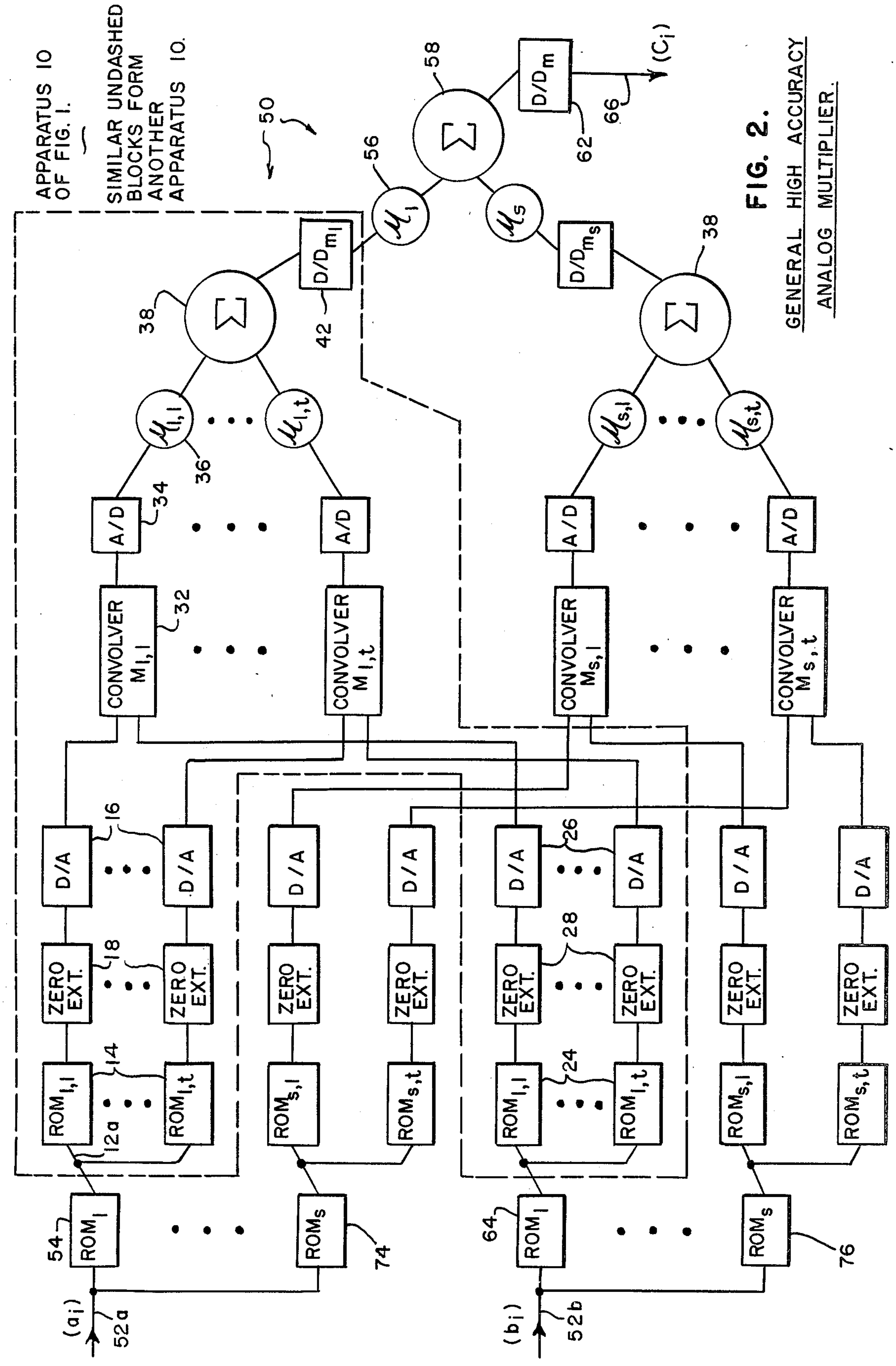
FIG. 2 is a block diagram of a general high-accuracy analog multiplier, using a plurality of the multipliers of FIG. 1.

As is shown in FIG. 2, the embodiment 50 comprises a plurality s of the basic multiplier 10 shown in FIG. 1. The apparatus 50 further comprises a read-only memory 54, connected between the source of signals $a_i$ at 52*a* and the first plurality of t ROMs, at input 12*a*, for storing the values of the numbers $a_i$; the combination comprising an apparatus for processing $a_i$ numbers.

In a similar manner, a read-only memory 64 is connected between the source 52*b* of signal $b_i$ and the second plurality of t ROMs 24, for storing the values of the numbers $b_i$; the combination comprising an apparatus for processing $b_i$ numbers.

The combination 50 shown in FIG. 2 further comprises a plurality of $s-1$ apparatuses for processing $a_i$ numbers, connected in parallel with the first-named apparatus for processing $a_i$ numbers, making a total of s parallel apparatuses. ROM 74 is an end member f the s-th parallel apparatus.

Similarly, there is a plurality of $s-1$ apparatuses for processing $b_i$ numbers, connected in parallel with the first-named apparatus for processing $b_i$ numbers. ROM 76 designates a member of the s-th such apparatus.

The apparatus 50 for multiplying two sequences of numbers further comprises another plurality of s multipliers 56, each of whose inputs comprises an output from a means 42 for reducing the output of the first signal summers 38.

A second means 58 for summing, which has as its inputs the outputs of multipliers 56, sums the outputs of the multipliers.

A second means 62, whose input is connected to the output of the second summing means, reduces the output of the second summing means to a value between $0 \leqq m(=m_1 m_2 \ldots m_t) - 1$ congruent to it, the output, modulo m.

The theory required to understand the invention will now be discussed. General background information with respect to theory applicable to this invention is discussed in U.S. Pat. No. 4,041,284, to James W. Bond, which issued on 9 Aug. 1977, and is entitled SIGNAL PROCESSING DEVICES USING RESIDUE CLASS ARITHMETIC. Digital circuits to do residue class arithmetic, important elements of the invention, are described in Flore, Ivan, The Logic of Computer Arithmetic, Prentice-Hall, Inc., 1963, Englewood Cliffs, New Jersey, 07632.

Consider the product of two integers c and d base b. Let $$c = c_{N-1}b^{N-1} + c_{N-2}b^{N-2} + \ldots + c_0 b^0 \quad (1)$$

and $$d = d_{N-1}b^{N-1} + d_{N-2}b^{N-2} + \ldots + d_0 b^0, \text{ with} \quad (2)$$

$$0 \leqq c_i, d_i \leqq b-1 \quad (3)$$

Then the product cd can be viewed as $$cd = \sum_{k=0}^{2(N-1)} \left( \sum_{i+j=k} c_i d_j \right) b^i \quad (4)$$

The innser sum can have at most N terms and hence is bounded by $(b-1)^2 N$.

If $m_1, m_2, \ldots, m_t$ are pairwise relatively prime integers such that $$\prod_{i=1}^{t} (m_i - 1) > (b-1)^2 N, \quad (5)$$

then from a knowledge of the value of $$P_k = \sum_{i+j=k} c_i d_j \text{ modulo } m_i, \quad (6)$$

$$i = 1, \ldots, t, \quad (7)$$

its value can be uniquely determined. Two integers are said to be relatively prime if neither one is a factor of the other. Neither number itself need be prime.

The value of modulo $m_i$ remains unchanged if the $c_i$, $d_j$ are replaced by any integers congruent to them modulo $m_i$. This allows the calculation of $P_k$ by inputs whose magnitude is no larger than $m_i - 1$. The output of the digital/analog device, 16 or 26, calculating $P_k$ modulo $m_i$ will have a magnitude no larger than $N (m_i 31\ 1)^2$. Then by determining the integer closest to the output via analog-to-digital conversion, using A/D converters 34, the analog device 50 can be used to calculate $P_k$ mod $m_i$ exactly.

The block diagram for the basic structure 10 is given in FIG. 1. The read-only memory $ROM_i$ 14 is used to code $a_i$, at input 12*a*, into $$a_{j,i} \equiv a_j \text{ modulo } m_i \quad (8)$$

$$\text{with } 0 \leqq a_{j,i} \leqq m_i - 1. \quad (9)$$

After digital-to-analog conversion the sequences $(a_{j,i})$, $(b_{j,i})$ are extended by $N-1$ zeros, by zero extenders 18, and convolved by an analog convolver 32 denoted $m_i$ to indicate that the output of the convolver is to be viewed as an approximation to the convolution $(a_{j,i}) * (b_{j,i})$ modulo $m_i$. The output of the convolver $m_i$, 32, is reconverted to digital, by A/D converters 34, multiplied by the fixed integer $u_i$ by multipliers 36, and fed into a summer 38. The output of the summer is reduced to the integer between $$0 \leqq m(=m_1 m_2 \ldots m_t) - 1 \quad (10)$$

congruent to it modulo m, by circuit 42.

Given integers $m_1, \ldots, m_t$, pairwise relatively prime, the $u_1, u_2, \ldots, u_t$ are integers known to exist (reference, The Logic of Computer Arithmetic, Chap., 18, Ivan Flores), with the property that:

$$u_i \equiv 1 \bmod m_i \text{ and } u_j \equiv 0 \bmod m_j \text{ for } j \neq i. \quad (11)$$

The circuits to do these calculations are also described in the same reference, and so may be considered digital state of the art.

FIG. 2 is a block diagram for the general structure 50. The two input sequences $(a_i)$ and $(b_i)$ are first reduced modulo $m_1, \ldots, m_s$ by ROMs 54 to sequences of integers between 0 and $m_1 - 1$, 0 and $m_2 - 1, \ldots$, 0 and $m_s - 1$, respectively. Then the integers modulo $m_i$ are further reduced modulo $m_{i,1}, \ldots m_{i,t}$, by ROMs 14, to integers between 0 and $m_{i,1} - 1$, 0 and $m_{i,2} - 1, \ldots$, 0 and $m_{i,t} - 1$ respectively.

They then are converted from digital-to-analog, by D/A converters 16. Corresponding sequences of a's and b's are convolved, by convolvers 32, followed by conversion back to digital, by A/D converters 34. The integers $u_{i,1}, u_{i,2}, \ldots, u_{i,t}$, $i = 1, \ldots, s$ are integers such that $$u_{i,j} \equiv 1 \bmod m_{i,j} \text{ and } u \equiv 0 \bmod m \text{ if } k \neq j. \quad (12)$$

The outputs of the convolvers 32, after digital conversion labeled $m_{i,1}$ to $m_{i,t}$ by A/D converters 34, are multiplied by the $u_{i,1}$ to $u_{i,t}$ multipliers 36, respectively, and summed, in summers 38. The sum is congruent to an integer between 0 and $m_i = m_{i,1}, \ldots, m_{i,t} - 1$, which is next determined. The integers obtained by reduction modulo $m_1, \ldots, m_s$, by circuits 42, are multiplied by u, $\ldots, u_s$, 42, in second summer 58. This output is reduced modulo $$m = m_1 \ldots m_s, \quad (13)$$

in circuit 62 to give the desired answer. It will be noted that the $u_i$ are integers such that $$u_i \equiv 1 \bmod m_i \text{ and } u_i \equiv 0 \bmod m_j. \quad (14)$$

The circuits which can accomplish this are state-of-the-art circuits, described in the reference cited hereinabove.

Examples:

$$R = 5, N = 3, m_1 = 3, m_2 = 4, m_3 = 5. \quad (15)$$

It will be noted that $$N(R-1)^2 = 48 < m = (3)(4)(5) = 60 \quad (16)$$

The required accuracy of the analog device is 1 part in $$2N(m_3 - 1)^2 = 96$$

so that an analog convolver of 1% accuracy will be required. The following values of $u_i$ can be used:

$$u_1 = 20,\ u_2 = \ 15,\ u_3 = -24. \quad (18)$$

The required read-only-memories are described in TABLE 1.

TABLE 1

Description of $ROM_2$ Required for $R = 5$, $m_1 = 3$, $m_2 = 4$

| NUMERICAL INPUT REGISTER | STORED VALUE IN MEMORY | BINARY REPRESENTATION OF STORED VALUE |
|---|---|---|
| $ROM_1$ | | |
| 0 | 0 | 00 |
| 1 | 1 | 01 |
| 2 | 2 | 10 |
| 3 | 0 | 00 |
| 4 | 1 | 01 |
| $ROM_2$ | | |
| 0 | 0 | 00 |
| 1 | 1 | 01 |
| 2 | 2 | 10 |
| 3 | 3 | 11 |
| 4 | 0 | 00 |

Because $R = 5$ and $m_3 = 5$, a read-only-memory is not needed, because $a_i = a_{i,3}$ and $b_i = b_{i,3}$.

In this example $$a = a_2R^2 + a_1R + a_0 \quad (19)$$

$$b = b_2R^2 + b_1R + b_0 \quad (20)$$

so that $$c_0 = a_0b_0,\ c_1 = a_0b_1 + a_0b_2 + a_1b_1 + a_2b_0, c_3 = a_1b_2 + a_2b_1 + a_2b_1, \text{ and } c_4 = a_2b_2. \quad (21)$$

The convolver 32 can be described by describing what is being calculated by the convolver at successive clock times. TABLE 2 describes the 3 multiplications required, which along with an adder form a convolver. The $m_i$-th convolver 32 is in effect caculating $(b_{0,i}, b_{1,i}, 0, 0)^* (a_{0,i}, a_{1,i}, a_{2,i}, 0, 0)$.

TABLE 2

Description of Convolvers for $R = 5$, $N = 3$, $m_1 = 3$, $m_2 = 4$, and $m_3 = 5$ Input sequences $(a_{0,i}, a_{1,i}, a_{2,i})$ and $(b_{0,i}, b_{1,i}, b_{2,i})$ are convolved as follows, assuming the $a_{k,i}$ weights are fixed and the $b_{k,i}$ weights slide by.

| | Times | Weights | | | Output |
|---|---|---|---|---|---|
| | Fixed Inputs to Multipliers | $a_{0,i}$ | $a_{1,i}$ | $a_{2,i}$ | |
| Variable | 0 | $b_{0,i}$ | $b_{1,i}$ | $b_{2,i}$ | $c_{0,i}$ |
| Inputs | Δt | $b_{1,i}$ | $b_{0,i}$ | 0 | $c_{1,i}$ |
| to | 2Δt | $b_{2,i}$ | $b_{1,i}$ | $b_{0,i}$ | $c_{2,i}$ |
| Multipliers | 3Δt | 0 | $b_{2,i}$ | $b_{1,i}$ | $c_{3,i}$ |
| | 4Δt | 0 | 0 | $b_{2,i}$ | $c_{4,i}$ |

A state of the art charge-coupled device convolver, referred to as the "Charge Transport Correlator", developed by Tiemann (reference Tiemann, J. J., et al, *A Surface Charge Correlator,* IEEE Journal of Solid State Circuits, Vol. 38-9, No. 6, December 1974, pp. 403-409), can be used to perform the convolutions. The D/Dm digital conversion, by circuits 42 and 62, is also state of the art (reference Flore). These convolvers 32 accept one digital input so that one of the analog-to-digital converters 34 described in the basic structure 10 (FIG. 1) is not required.

With respect to alternative constructions, the multipliers, 36 and 56, have been described utilizing a particular charge coupled device, but they could utilize any analog tap delay wire for which the tap weights could change with time. Surface wave devices presently being used to perform convolutions could be used.

If the tapped delay line can utilize positive or negative integers, then least magnitude residues can be utilized. This would allow more different $m_i$ to be used for a specified accuracy device, having parameters R and N.

A charge-coupled device can be used with both sequences appropriately extended with zeros to handle positive and negative inputs, so that the positive and negative components of the answer are calculated at successive output times.

Obviously, many modifications and variations of the present invention are possible in the light of the above teachings, and, it is therefore understood that within the scope of the disclosed inventive concept, the invention may be practiced otherwise than specifically as described.

What is claimed is:

1. An apparatus for multiplying two sequences of N digital numbers $a_i$ and $b_i$, which may represent signal pulses of various amplitudes, comprising:

a first plurality of t read-only memories (ROMs), having a common input adapted to receive the sequence of numbers $a_i$, each ROM coding the numbers $a_i$ into $a_{j,i}=a_j$ modulo $m_i$, with $0 \leqq a_{j,i} \leqq m_i-1$;

a first plurality of t extending means, an input of each connected to an output of a read-only memory, for extending the digital signal with N-1 zero values;

a first plurality of t digital-to-analog (D/A) converters, an input of each being connected to an output of a zero extender, for converting the digital quantity received from the extender into its corresponding analog value;

a second plurality of t read-only memories (ROMs), having a common input adapted to receive the sequence of numbers $b_i$, each ROM coding the numbers $b_i$ into $b_{j,i}=b_j$ modulo $m_i$, with $0 \leqq b_{j,i} \leqq m_i-1$;

a second plurality of t extending means, an output of each connected to an output of a read-only memory of the second plurality, for extending the digital signal with $N-1$ zero values;

a second plurality of t digital-to-analog (D/A) converters, an input of each being connected to an output of a zero extender of the second plurality, for converting the digital quantity received from the extender into its corresponding analog value;

a plurality of t means for convolving two input analog signals, one from each of the first and second D/A converters, the output of each convolving means being an analog convolved signal, approximately equal to the convolution $(a_{j,i}) * (b_{j,i})$ modulo $m_i$;

a plurality of t analog-to-digital (A/D) converters, each having its input connected to the output of one of the convolvers, for converting the analog signal back to digital form;

a plurality of t means for multiplying by an integer $u_i$, each means having an input connected to an output of an A/D converter, the integer $u_i$ being defined by the relationship $u_i=1$ mod $m_i$ and $u_j=0$ mod $m_j$ for $j \neq i$, where the $m_i$ represent integers and the $u_i$ represent integers pairwise relatively prime;

means for summing, whose input comprise the t multiplying means; and means, whose input is connected to the output of the summing means, for reducing the output of the summing means to a value between $0 \leqq m(=m_1 m_2 \ldots m_t)-1$ congruent to the output modulo m.

2. The apparatus according to claim 1, further comprising:

a read-only memory, connected between the source of signals $a_i$ and the first plurality of t ROMs, for reducing modulo $m_1, \ldots, m_s$, the values of the numbers $a_i$ to a sequence of integers between 0 and $m_1-1$, 0 and $m_2-1, \ldots$, 0 and $m_s-1$, the combination comprising an apparatus for processing $a_i$ numbers; and a read-only memory, connected between the source of signals $b_i$ and the second plurality of t ROMs, for reducing modulo $m_1, \ldots, m_s$, the values of the numbers $b_i$ to a sequence of integers between 0 and $m_1-1$, 0 and $m_2-1, \ldots$, 0 and $m_s-1$, the combination comprising an apparatus for processing $b_i$ numbers.

3. The combination according to claim 2, further comprising:

a plurality of $s-1$ apparatuses for processing $a_i$ numbers, connected in parallel with the first-named apparatus for processing $a_i$ numbers;

a plurality of $s-1$ apparatuses for processing $b_i$ numbers, connected in parallel with the first-named apparatus for processing $b_i$ numbers; the apparatus for multiplying two sequences of numbers further comprising:

another plurality of s means for multiplying each of whose inputs comprises an output from a means for reducing the output of the first signal summer;

a second means for summing, whose input comprises the s means for multiplying, for summing the outputs of the multipliers; and a second means, whose input is connected to the output of the second summing means, for reducing the output of the second summing means to a value between $0 \leqq m(=m_1 m_2 \ldots m_t)-1$ congruent to it modulo m.

4. The combination according to claim 1, wherein:

the means for convolving comprises charge-coupled devices.

5. The combination according to claim 4 wherein:

the means for multiplying comprise charge coupled devices.

6. The combination according to claim 4 wherein:

the means for multiplying comprise analog tapped delay lines.

7. The combination according to claim 3 wherein:

the means for convolving comprises charge-coupled devices.

8. The combination according to claim 7 wherein:

the means for multiplying comprise charge coupled devices.

9. The combination according to claim 8 wherein:

the means for multiplying comprise analog tapped delay lines.

* * * * *